Nov. 4, 1947. C. A. ARENS 2,430,418
CONTROL MECHANISM
Filed Jan. 23, 1943 2 Sheets-Sheet 1
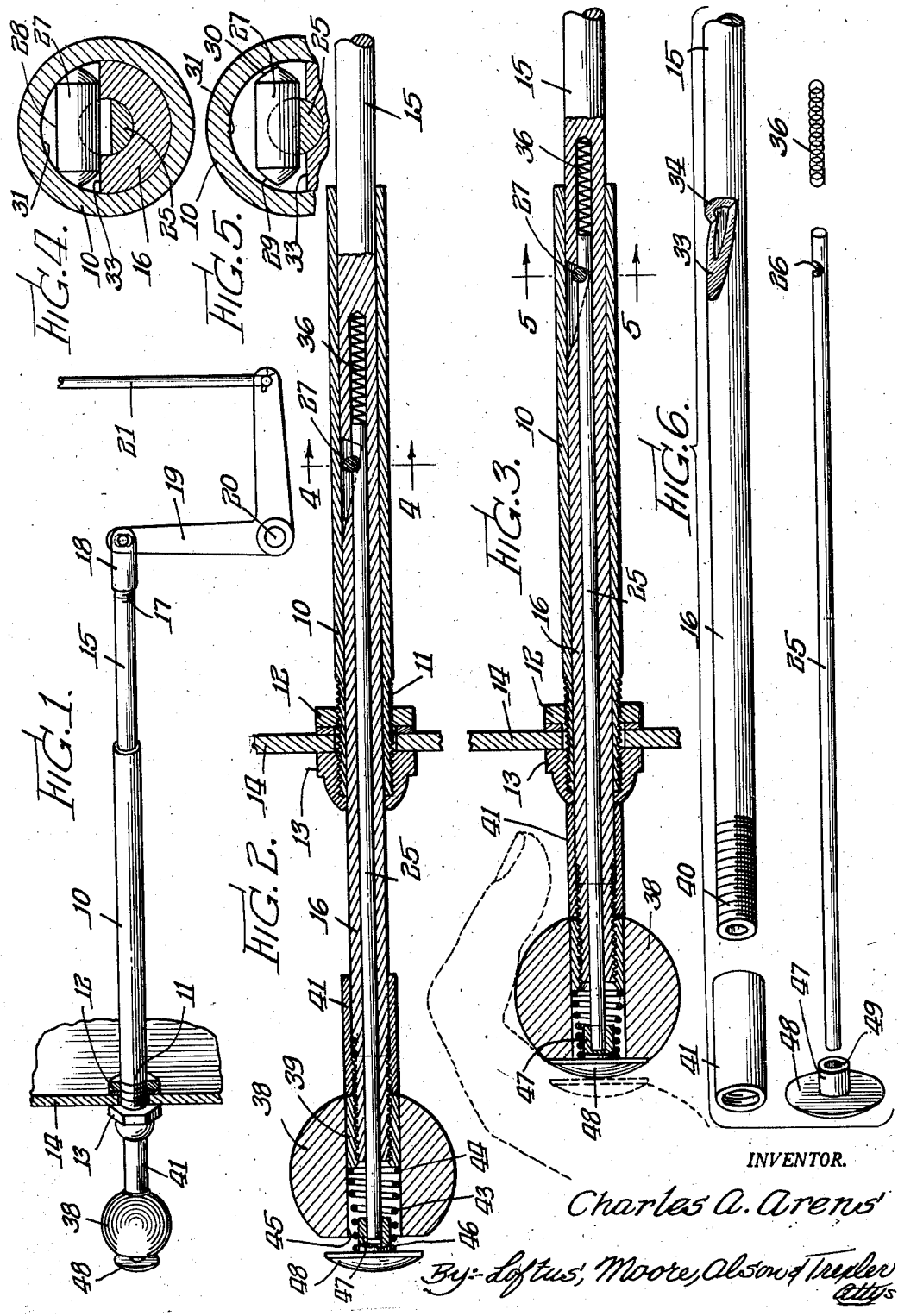
INVENTOR.
Charles A. Arens
By: Loftus, Moore, Olson & Trexler
Attys Nov. 4, 1947.        C. A. ARENS        2,430,418
CONTROL MECHANISM
Filed Jan. 23, 1943        2 Sheets-Sheet 2
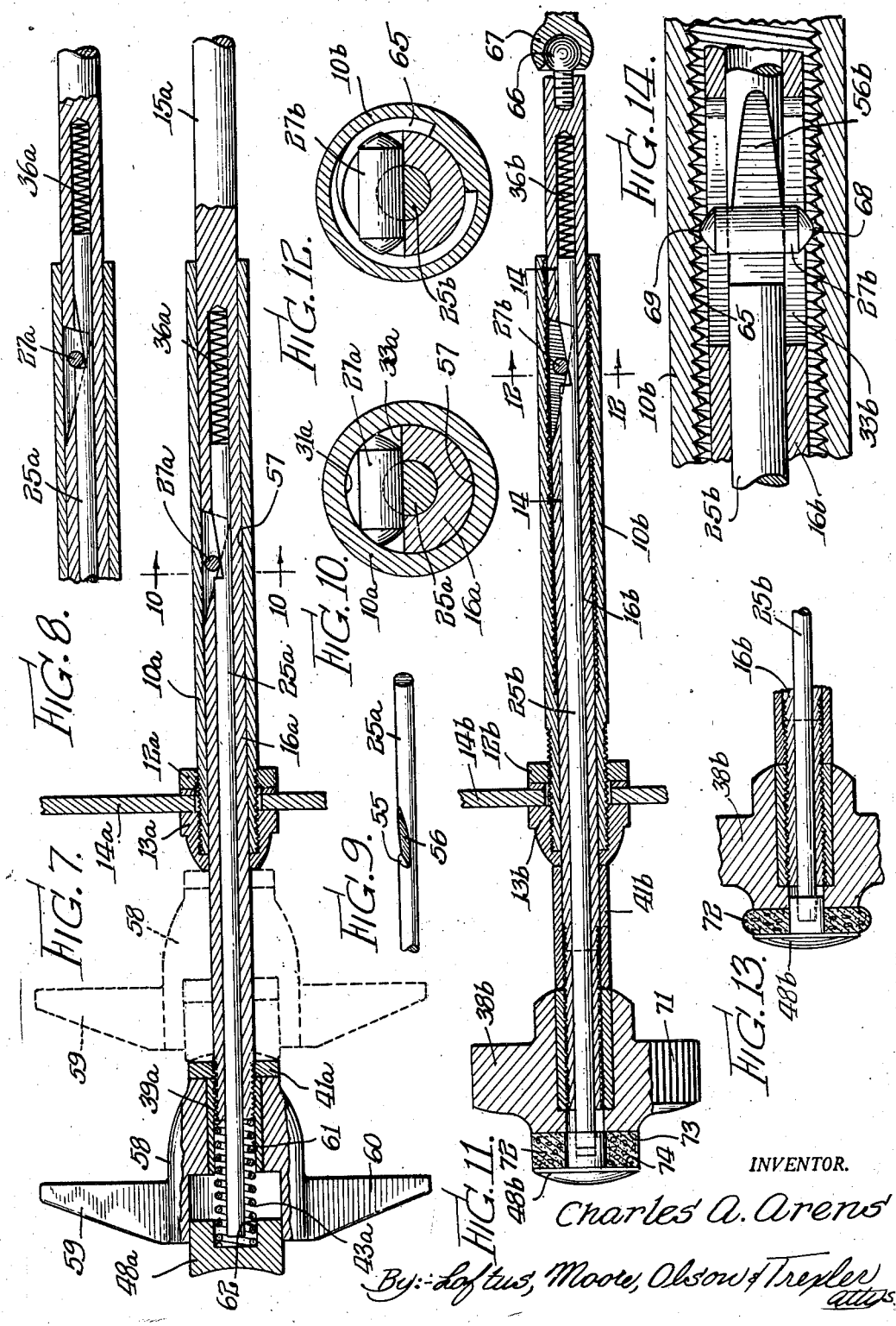
INVENTOR.
Charles A. Arens
By: Loftus, Moore, Olson & Trexler
attys.

Patented Nov. 4, 1947

2,430,418

UNITED STATES PATENT OFFICE 2,430,418

CONTROL MECHANISM

Charles A. Arens, Chicago, Ill., assignor to Arens Controls, Inc., Chicago, Ill., a corporation of Illinois Application January 23, 1943, Serial No. 473,306

20 Claims. (Cl. 74—503)

This invention relates to control mechanisms, particularly of the type adapted to releasably lock or hold an adjustable control member in adjusted position.

It is an object of the invention to provide a control mechanism of the type stated of improved construction and operation; and more specifically to provide a control mechanism of smooth operation and good locking effectiveness wherein the parts may be readily fabricated and assembled to provide a reliable control mechanism structure.

A further object of the invention is to provide a control mechanism of the type defined having an improved handle structure, facilitating both assembly and operation.

A still further object of the invention is to provide a control mechanism of the type defined wherein in association with the locking or holding means, improved mechanism is provided for effecting micrometer adjustments of the controlled structures.

Various other objects, advantages and features of the structure will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view of a control mechanism constructed in accordance with and including the structures of the invention, in accordance with one preferred embodiment thereof;

Fig. 2 is a longitudinal sectional view, on an enlarged scale, of a portion of the control mechanism of Fig. 1;

Fig. 3 is a view similar to Fig. 2 but showing the locking or holding means in released position;

Fig. 4 is a transverse sectional view of the structure on a further enlarged scale, and taken on the line 4—4 of Fig. 2;

Fig. 5 is a view similar to Fig. 4 but showing the locking or holding means in released position, as indicated by the line 5—5 of Fig. 3;

Fig. 6 is an exploded view showing various parts of the control mechanism;

Fig. 7 is a view similar to Fig. 2 but illustrating a modified embodiment of the invention;

Fig. 8 is a partial view of the structure of Fig. 7, but illustrating the locking or holding means in released position;

Fig. 9 is a detail perspective view of the control or locking rod, as embodied in the structure of Fig. 7;

Fig. 10 is a transverse sectional view of the structure of Fig. 7 on the line 10—10 thereof;

Fig. 11 is a sectional view of a control mechanism, similar to Figs. 2 and 7, but illustrating a still further modified embodiment of the invention;

Fig. 12 is a transverse sectional view of the structure of Fig. 11 on the line 12—12 thereof;

Fig. 13 is a detail view of the handle structure as embodied in the device of Fig. 11, and showing the handle in released position; and Fig. 14 is a longitudinal sectional view, on an enlarged scale, of the mechanism of Fig. 11, and taken on the line 14—14 thereof.

This application is a continuation-in-part of my prior copending application, Serial No. 395,980, filed may 31, 1941, and entitled "Control mechanism," now issued as Patent 2,340,830, dated February 1, 1944.

Referring more specifically to the drawings, and first to the embodiment illustrated in Figs. 1 to 6, inclusive, the control mechanism shown comprises a housing or frame member 10, threaded along a portion of its length, as indicated at 11, and adapted to be secured by means of nuts 12 and 13 to a support panel or wall structure 14. Specifically, the frame member 10 is in the form of an elongated sleeve of suitable length to provide a slidable support structure for the shiftable parts of the control mechanism.

As shown in Fig. 2, an operating member in the form of an elongated rod 15 is longitudinally slidable within the frame sleeve 10, the end of the operating rod being drilled or otherwise suitably formed to provide a sleeve-like end section as indicated at 16. The rod 15 may be connected in any suitable manner to a device to be controlled such, for example, as an elongated flexible transmission cable, lever, or other controlled mechanism. As shown in Fig. 1, the end of the rod 15 is threaded as indicated at 17, and provided with a fitting 18 by which it is secured to one arm of a bell-crank lever 19 suitably pivoted to a frame or other supporting element as indicated at 20. The other arm of the bell-crank is connected to operate a link 21 leading to the controlled device. It is to be understood that the connections shown are set forth for purposes of illustration only and that the operating member 15 may be arranged to operate various control mechanisms. As stated, a device of the character shown is well adapted for the operation of elongated flexible controls, such as Bowden wires and the like, for use in aircraft and other vehicle installations. In such instances the support wall 14 would, for example, constitute the control panel or dashboard of the vehicle or aircraft.

A control or locking member 25, Fig. 2, is longitudinally reciprocable through predetermined limits within the sleeve-like portion 16 of the operating member. The member 25 is in the form of an elongated rod or shaft. As best shown in Fig. 6, this rod is provided adjacent its inner end with a substantially semi-cylindrically shaped recess or cut away portion 26 which recess is adapted to receive and control the movements of a locking or holding element 27. This locking or holding element may take various forms, but preferably it is a rotatable element such, for example, as a ball or roller. Also, preferably it comprises a roller of the shaping which is best illustrated in Figs. 4 and 5 providing maximum smoothness and effectiveness in its cooperation with the coacting parts. More specifically, referring to Figs. 4 and 5, the roller 27 is provided with a cylindrical surface 28 and at its opposite ends with conical surfaces 29 and 30. These conical end surfaces are curved to conform to the curvature of the internal surface 31 of the housing sleeve 10 whereby to provide a maximum surface of contact between the holding element 27 and the housing sleeve when the element is brought into engagement with the sleeve, as indicated in Fig. 4. Similarly, the cylindrical surface 28 of the holding element provides maximum areas of contact between the element and the engaged surfaces of the operating sleeve 16. To this end, as best shown in Fig. 6, the operating sleeve is provided with a notch or cut-out, which notch provides in the sleeve an angular cam surface 33 for locking or holding cooperation with the element 27, and an abutment surface 34. The cam surface 33 is flat, and provides with the cylindrical surface 28 of the holding element a maximum area of contact. By properly proportioning the size of the element 27, as to diameter and length, the areas of the cylindrical surface 28 and of the conical end surfaces 29 and 30 may be proportioned in a manner so as to provide the proper and desired surfaces of contact between the holding element and the operating and holding sleeve surfaces 33 and 31, depending upon the hardness of the materials, operating forces, et cetera. By this means the holding element 27 is prevented from imbedding itself within the sleeve surfaces 33 and 31, or otherwise marring or indenting either the sleeve surfaces or the engageable surfaces of the element itself. Smoothness of operation, ready releasability, and maintained durability and reliability of the structure is insured.

In operation, it will be seen that when the control rod 25 is in its rightward position, as indicated in Figs. 3 and 5, the holding or locking element 27 lies within the cut-out 26 of the rod 25, out of engagement with the surface 31 of the housing sleeve. In this condition of the parts the operating member 15 may be readily shifted in either direction with respect to the housing or frame sleeve 10. However, when the control rod 25 is shifted to its rightward position, as indicated in Figs. 2 and 4, the holding roller 27 is brought into engagement with the angular cam surface 33 of the operating sleeve 16 and with the internal surface 31 of the housing sleeve, as shown in Fig. 4, and in this condition of the parts, while the operating sleeve may still be relatively freely pulled to the left as seen in Figs. 1, 2 and 3, rightward movement of the sleeve is prevented due to the wedging action of the roller 27 against the surfaces 33 and 31 as rightward movement of the operating sleeve is attempted.

A relatively light compression spring 36, Figs. 2 and 3, is provided, engageable against the end of the control rod 25, for normally urging the rod into its leftward or locking position, as shown in Fig. 2.

A handle structure is provided for controlling the shiftable movements of the operating sleeve 16, and also for shifting the control rod 25 to its rightward or release position. More specifically, this handle structure comprises a main handle member 38 substantially in the form of a spherical ball as shown in Figs. 1, 2 and 3, which handle member is secured on the end of the operating sleeve 16 by means of a bushing 39 press-fitted into the handle member and threaded onto the threaded end portion 40 (see Fig. 6) of the operating sleeve. A spacing and locking sleeve 41 is also threaded onto the end portion 40 of the operating sleeve, this spacing sleeve being adapted to abut the nut 13 when the control mechanism is moved to its Fig. 3 position, whereby to limit the inward movement of the operating sleeve. The bushing 39 may be threadedly adjusted along the threaded portion 40 of the operating sleeve, whereby to accurately position the handle 38 thereon, particularly in reference to the length of the control rod 25, the sleeve 41 then being turned into abutting engagement with the bushing 39 so that the sleeve locks the handle in position, similar to the action of a lock nut.

A conical spring 43, Fig. 2, is disposed within the central recess of the handle knob, the convolutions of the spring at its inner end, as indicated at 44 being of such size that they provide a tight frictional grip with the inner surface 45 of the handle recess. The outer convolutions of the spring, as indicated at 46, frictionally embrace and grip the projection 47 of a release button 48, which projection is provided with a central recess 49, Fig. 6, adapted for cooperation with the outer end of the control rod 25.

It will be seen that by the arrangement thus provided, the release button 48 may be first assembled with respect to the handle member 38, prior to the assembly of the handle upon the operating sleeve 16 into which the control rod 25 has previously been inserted. In other words, the conical spring 43 forms means by which the release button 48 may be first assembled with respect to the handle 38, and the composite handle and release button assembly then brought into position for engagement with the other parts of the structure. If for any reason the handle 38 is later removed from the other structural parts, the release button 48 will automatically be removed as a unit therewith, due to the frictional gripping actions of the conical spring 43. At the same time the release button is shiftably mounted with respect to the handle so that it can be moved from an outward position as indicated in Fig. 2, to an inner position in contact with the end wall of the handle, as shown in Fig. 3. When the release button is operated to its Fig. 3 position, it engages the end of the control rod 25 and shifts the latter to release the holding element 27. By means of the handle 38, the operating sleeve 16 is shiftable to its various positions of adjustment.

It will be seen that the structure thus provided may be readily fabricated and assembled. The frame 10 is in the form of a simple elongated sleeve which may be readily made and assembled into position with respect to the support wall 14. Similarly the operating shaft 15 with its associated sleeve portion 16 may be readily fabricated, and the centrally disposed control rod placed in position therein. The composite handle and release button structure may then be assembled as previously described. No cumbersome or involved machining or assembly operations are required, and a reliable structure of smooth operation and good locking effectiveness is produced. The roller 27, providing maximum areas of contact both with the housing sleeve surface 31 and with the angular cam locking surface 33 of the operating sleeve 16 provides durability, ready releasability, and efficiency of operation. The engageable surfaces will not become pitted or marred whereby to produce lack of smoothness in the operation of the structure.

In Figs. 7 to 10 inclusive a modified embodiment is illustrated, generally similar to the embodiment previously described, but incorporating a modified form of handle, and also incorporating means for providing an increased frictional resistance to movement of the operating sleeve outwardly or to the left as seen in Fig. 7, when the locking or holding means is in operative position.

More specifically, referring to Fig. 9, in this instance the control rod indicated at 25a, and corresponding to the rod 25 previously described, instead of being provided with a notch in the form of the notch 26, is provided with a notch forming an abutment surface 55 and a cam surface 56 for cooperation with the locking element. The locking element, as indicated at 27a, may be of the shape and form of the locking element 27 previously described, and the operating and frame sleeves 16a and 10a, respectively, may also be of the structure previously described in reference to the sleeves 16 and 10.

In operation, when the control rod 25a is in its rightward or release position, as shown in Fig. 8, the holding element 27a is held in a released positon, such for example as previously described in reference to Fig. 5. However, when the control rod is shifted to the left by the spring 36a, as illustrated in Fig. 7, not only is the locking element 27a brought into engagement with the surface 31a of the frame sleeve and the cam surface 33a of the operating sleeve, but also the angular cam surface 56 of the control rod is compressed against the element 27a. This action tends to thrust the control rod 25a downwardly, as seen in Figs. 7 and 10, thereby bringing the operating sleeve into frictional engagement with the frame sleeve along an area as indicated at 57 in Figs. 7 and 10, whereby to resist movement of the operating sleeve 16a relative to the frame sleeve. Whereas the spring 36 in the embodiment previously described would preferably be a light spring sufficient only to shift the locking element into operative position, in the structure of Fig. 7 the spring 36a may be of somewhat increased size or tension whereby to provide the desired frictional resistance at the point 57. Accordingly, in the structure of Fig. 7, when the element 27a is in holding or locking position not only is the operating sleeve 16a precluded from movement to the right, as seen in Fig. 7, by a substantially positive locking action, but also a predetermined frictional resistance to movement of the operating sleeve to the left is provided, the magnitude of which may be controlled as desired.

The handle structure illustrated in Fig. 7 differs somewhat from that previously described, but embodies the same principles of construction. More specifically, the main operating handle is in this instance formed of a body portion 58 provided with a pair of oppositely extending projections 59 and 60 whereby to provide a T handle structure. As in the previously described embodiment, a bushing as indicated at 39a is press-fitted into the handle, the bushing being screw threaded onto the end of the operating sleeve 16a. Also, a lock nut and spacing member 41a is provided similar in purpose and function to the sleeve 41 described in reference to Figs. 1–6.

A spring 43a is of such size that it has frictional gripping engagement with the internal surface 61 of the bushing 39a. This spring also has frictional gripping engagement with the surface 62 of an internal bore formed in the release button 48a whereby the spring holds the release button associated with the main operating handle, similar to the function and purpose of the spring 43 in the embodiment of Figs. 1–6. In operation, when the release button 48a is pressed inwardly or to the right as seen in Fig. 7, it engages the control rod 25a to shift it into released position, for example as indicated in Fig. 8. The function and purpose of the release button 48a is similar to that previously described in reference to the release button 48. It will be understood that the springs 43 and 43a not only hold the release buttons in association with the handle structure, but also normally hold the release buttons outwardly in inoperative position as indicated, respectively, in Figs. 2 and 7.

In Figs. 11 to 14 inclusive a still further embodiment of the invention is illustrated. This embodiment is generally similar to that previously described in reference to Figs. 7–10 except that it additionally embodies micrometer adjustment means, and also a slightly different form of handle structure is provided.

In this instance the main frame or housing sleeve, as shown at 10b is provided along its internal surface with a screw thread or similar helical groove as indicated at 65. Accordingly, when the holding element 27b is thrust into locked position, as shown in Figs. 11, 12 and 14, instead of engaging a smooth internal surface on the housing sleeve, the ends of the holding element are brought into engagement with the grooves of the internally formed screw thread. This action locks the operating sleeve 16b against direct axial shifting, but upon the imparting of a rotational movement to the operating sleeve, the operating sleeve together with the holding element 27b and the control rod 25b are all rotated as a unit within the housing sleeve and threaded therealong in the nature of a nut and bolt connection, whereby to effect micrometer adjustments of the operating sleeve. It will be seen that by reason of the arrangement provided micrometer adjustments may be effected by rotation of the operating sleeve while the sleeve remains locked against direct axial shifting.

To facilitate the rotation of the operating sleeve, the end thereof may be connected to the controlled device such, for example, as an elongated transmission cable, by means of a ball and socket connection as indicated at 66, 67, forming a universal joint. As will be best seen by reference to Fig. 14, the pitch of the screw thread 65 is such that the opposite ends 68 and 69 of the holding element are brought into engagement with corresponding portions of the screw thread contour whereby to insure proper balance in the action of the parts. It will be seen that two points of engagement between the screw thread and the holding element are provided. The ends of the holding element may be shaped to properly engage the surfaces of the screw thread, as shown. The housing sleeve 10b, the operating sleeve 16b, and the control rod 25b may be formed as in the embodiment illustrated in Fig. 7.

Referring to the handle structure illustrated in Fig. 11, this handle may be generally similar to the structure shown for example in Fig. 2 except that the contour of the handle member, as indicated at 38b, is somewhat differently shaped and is provided on its exterior periphery with serrations or knurling as indicated at 71, to facilitate rotation of the handle and thereby effect the rotation of the operating sleeve. Also in this instance the release button as indicated at 48b is secured to the main body of the handle by means of a sponge rubber connection as indicated at 72. This sponge rubber performs the same function and purpose as the conical spring 43 in the embodiment illustrated in Fig. 2. More specifically, the sponge rubber piece is adhesively secured to the main handle and to the release button as indicated at 73 and 74, thereby associating the main handle and release button together as a unit, and permitting their assembly in the completed structure as a unit, as in the case of the embodiments previously discussed. The manner in which the sponge rubber flexes to permit operation of the release button is indicated in Fig. 13.

It is obvious that various changes may be made in the specific embodiments set forth without departing from the spirit of the invention. The invention is accordingly not to be limited to the specific embodiments shown and described, but only as indicated in the following claims.

The invention is hereby claimed as follows:

1. A control mechanism comprising a frame member adapted to be fastened to a support, an operating member shiftable within the frame member and adapted to be connected to a device to be controlled, a handle for the operating member, and means for releasably holding the operating member with respect to the frame member comprising a pair of cam surfaces on the operating member and frame member and a holding element adapted to be wedged therebetween, the operating member having operating connections disposed on opposite sides of its cam surface, and means for controlling the operation of the holding element comprising a shiftable control member loosely engaging the holding element, and a handle for the control member juxtaposed to the operating member handle, said control member being concentrically disposed within the operating member at the holding station.

2. A control mechanism comprising a frame member adapted to be fastened to a support, an operating member shiftable within the frame member and adapted to be connected to a device to be controlled, a handle for the operating member, and means for releasably holding the operating member with respect to the frame member comprising a pair of cam surfaces on the operating member and frame member and a holding element adapted to be wedged therebetween, the operating member having operating connections disposed on opposite sides of its cam surface, and means for controlling the operation of the holding element comprising a shiftable control member loosely engaging the holding element, and a handle for the control member juxtaposed to the operating member handle, said control member being disposed in parallel relation with the operating member and being disposed within the operating member at the holding station.

3. A control mechanism comprising a frame member adapted to be fastened to a support, an operating member shiftable in respect to the frame member and adapted to be connected to a device to be controlled, and means for releasably holding the operating member with respect to the frame member comprising a pair of cam surfaces on the operating member and frame member and a holding element adapted to be wedged therebetween, the operating member having operating connections disposed on opposite sides of its cam surface, and means for controlling the operation of the holding element comprising a shiftable control structure and a handle associated therewith, and a spring directly engaging the control structure for shifting it in a predetermined direction, said control structure loosely engaging the holding element and being symmetrically formed and of substantially uniform cross section along its length between the holding element engaging portion and said handle.

4. A control mechanism comprising a frame member adapted to be fastened to a support, an operating member shiftable within the frame member and adapted to be connected to a device to be controlled, a handle for the operating member, and means for releasably holding the operating member with respect to the frame member comprising a pair of cam surfaces on the operating member and frame member and a holding element comprising a roll member adapted to be wedged therebetween, the operating member having operating connections disposed on opposite sides of its cam surface, and means for controlling the operation of the holding element comprising a shiftable control member having a notch loosely receiving the roll, and a handle for the control member juxtaposed to the operating member handle, said control member being concentrically disposed within the frame member and the operating member at the holding station.

5. A control mechanism comprising a frame sleeve adapted to be fastened to a support, an operating sleeve shiftable within the frame sleeve and adapted to be connected at one end to a device to be controlled, a handle connected to the other end of the operating sleeve, and means for releasably holding the operating sleeve with respect to the frame sleeve comprising a pair of cam surfaces on the operating sleeve and frame sleeve and a holding element adapted to be wedged therebetween, the operating member having operating connections disposed on opposite sides of its cam surface, and means for controlling the operation of the holding element comprising a shiftable control rod loosely engaging the holding element, and a handle for the control rod juxtaposed to the operating sleeve handle, said control rod being disposed within the operating sleeve in parallel relationship therewith.

6. A control mechanism comprising a frame sleeve adapted to be fastened to a support, an operating sleeve shiftable within the frame sleeve and adapted to be connected at one end to a device to be controlled, a handle fixed on the other end of the operating sleeve, and means for releasably holding the operating sleeve with respect to the frame sleeve comprising a pair of cam surfaces on the operating sleeve and frame sleeve and a holding roll element adapted to be wedged therebetween, the operating member having operating connections disposed on opposite sides of its cam surface, and means for controlling the operation of the holding element comprising a shiftable control member having a notch for receiving said roll element, and a handle fixed on one end thereof in juxtaposition to the operating sleeve handle, said control member being concentrically disposed within both the frame sleeve and the operating sleeve at the holding station.

7. A control mechanism comprising a frame member adapted to be fastened to a support, an operating member shiftable in respect to the frame member and adapted to be connected to a device to be controlled, and means for releasably holding the operating member with respect to the frame member comprising a pair of cam surfaces positively connected to the operating member and the frame member and a holding element cooperable therewith to effect a holding action therebetween, said holding element comprising an elongated roller having independent surfaces thereof shaped to conform respectively to each of said cam surfaces, and a shiftable control member for controlling the operation of the holding element.

8. A control mechanism comprising a frame member adapted to be fastened to a support, an operating member shiftable in respect to the frame member and adapted to be connected to a device to be controlled, and means for releasably holding the operating member with respect to the frame member comprising a pair of cam surfaces on the operating member and frame member and a holding element adapted to be wedged therebetween, said holding element comprising an elongated roller having independent surfaces thereof shaped to conform respectively to each of said cam surfaces to provide a maximum contact area therewith, and a shiftable control member for controlling the operation of the holding element.

9. A control mechanism as defined in claim 5, wherein said holding element comprises an elongated roller having the ends thereof shaped to provide line contact with the surface of the housing sleeve.

10. A control mechanism comprising a frame member adapted to be fastened to a support, an operating member shiftable in respect to the frame member and adapted to be connected to a device to be controlled, and means for releasably holding the operating member with respect to the frame member comprising a pair of relatively angularly disposed cam surfaces positively connected with the operating member and frame member and a holding element cooperable therewith to effect a holding action therebetween, and a shiftable control member for controlling the operation of the holding element, said control member being provided with a tapered face engageable with the holding element to effect a frictional holding engagement between the operating member and the frame member.

11. A control mechanism as defined in claim 5, wherein said shiftable control rod is provided with a tapered face engageable with the holding element to effect the frictional holding engagement of the operating sleeve with the frame sleeve.

12. A control mechanism comprising a frame member adapted to be fastened to a support, an operating member shiftable in respect to the frame member and adapted to be connected at one end to a device to be controlled, a handle connected to the other end of the operating member, and means for releasably holding the operating member with respect to the frame member comprising a pair of relatively angularly disposed cam surfaces positively connected with the operating member and frame member and a holding element cooperable therewith to effect a holding action therebetween, and a shiftable control member having a handle juxtaposed to the handle of the operating member for controlling the operation of the holding element, and means operable upon rotation of the operating member when the holding element is in holding position to effect micrometer longitudinal adjustment of the operating member with respect to the frame member.

13. A control mechanism as defined in claim 12, wherein said last named means comprises a screw thread formed along the inner surface of the frame member.

14. A control mechanism comprising a frame member adapted to be fastened to a support, an operating member shiftable in respect to the frame member and adapted to be connected to a device to be controlled, and means for releasably holding the operating member with respect to the frame member comprising a pair of cam surfaces and a holding element adapted to be wedged therebetween, means for controlling the operation of the holding element comprising a shiftable control member, a handle for the operating member, a handle for the control member, means forming a mechanical interlocking connection between one of said handles and its associated member and an abutting engagement between the other handle and its associated member, and resilient means secured to and connecting both said handles whereby to facilitate the assembly of the handles in the control mechanism as a unit, said connecting means being yieldable to permit relative movement between the handles.

15. A control mechanism as defined in claim 14, wherein said connecting means comprises a spring having portions frictionally engageable with and thereby secured to both said handles.

16. A control mechanism as defined in claim 14, wherein said connecting means comprises a resilient member of rubber-like material secured to both said handles.

17. A control mechanism comprising a frame member adapted to be fastened to a support, an operating member shiftable in respect to the frame member and adapted to be connected to a device to be controlled, and means for releasably holding the operating member with respect to the frame member comprising a pair of cam surfaces on the operating member and frame member and a holding element adapted to be wedged therebetween, and means for controlling the operation of the holding element comprising a shiftable control member, said control member being mounted within the operating member, a handle for the control member, a handle for the operating member, means forming a mechanical interlocking connection between one of said handles and its associated member and an abutting engagement between the other handle and its associated member, and resilient connecting means secured to and connecting both said handles for assembly in the control mechanism as a unit, said connecting means permitting relative movement between said handles.

18. A control mechanism comprising a frame member adapted to be fastened to a support, an operating member shiftable within the frame member and adapted to be connected at one end to a device to be controlled, and means for releasably holding the operating member with respect to the frame member comprising a pair of cam surfaces on the operating member and frame member and a holding element adapted to be wedged therebetween, the operating member having operating connections disposed on opposite sides of its cam surface, means for controlling the operation of the holding element comprising a shiftable control member having a notch for loosely receiving said element, said control member being concentrically disposed within the operating member at the holding station, and a pair of longitudinally reciprocable handle members connected, respectively, to the opposite end of the operating member and to the control member, said handle members being shiftable relatively toward each other to effect the release of the holding element.

19. A control mechanism comprising a frame member adapted to be fastened to a support, an operating member shiftable within the frame member and adapted to be connected at one end to a device to be controlled, and means for releasably holding the operating member with respect to the frame member comprising a pair of cam surfaces on the operating member and frame member and a holding element adapted to be wedged therebetween, means for controlling the operation of the holding element comprising a shiftable control member, said control member being disposed within the operating member at the holding station, and a pair of longitudinally reciprocable handle members rigidly connected, respectively, to the other end of the operating member and to the control member, the control member and its associated handle being projected axially through the operating member handle, and said handle members being shiftable relatively toward each other to effect the release of the holding element.

20. A control mechanism as defined in claim 5, wherein the frame sleeve cam surface engaged by the holding element comprises a screw thread formed along the inner surface of the frame sleeve whereby relative rotation of the operating sleeve and frame sleeve with the holding element in engagement with the screw thread effects micrometer adjustments of the operating sleeve.

CHARLES A. ARENS.

REFERENCES CITED

The following references are of record in the file of this patent:

UNITED STATES PATENTS

| Number | Name | Date |
|---|---|---|
| 432,278 | Maschmeyer | July 15, 1890 |
| 1,103,839 | Rellay | July 14, 1914 |
| 1,171,845 | Heaslet | Feb. 15, 1916 |
| 1,333,951 | Verderber | Mar. 16, 1920 |
| 1,831,335 | White | Nov. 10, 1931 |
| 1,866,244 | White | July 5, 1932 |
| 2,170,511 | Wenn | Aug. 22, 1939 |
| 2,212,375 | McCarthy | Aug. 20, 1940 |
| 2,262,448 | Boyce et al. | Nov. 11, 1941 |
| 2,271,799 | McCarthy | Feb. 3, 1942 |
| 2,273,334 | Shakespeare | Feb. 17, 1942 |
| 2,340,830 | Arens | Feb. 1, 1944 |

FOREIGN PATENTS

| Number | Country | Date |
|---|---|---|
| 481,199 | Great Britain | Mar. 8, 1938 |
| 396,931 | France | Apr. 24, 1909 |
| 595,342 | Germany | Apr. 9, 1934 |